United States Patent
Kovacs et al.

(10) Patent No.: US 6,170,227 B1
(45) Date of Patent: Jan. 9, 2001

(54) CUSHIONING PRODUCT AND MACHINE AND METHOD FOR PRODUCING SAME

(75) Inventors: Mozes Kovacs, Monroe; Stephen W. Sobel, Garfield, both of NJ (US)

(73) Assignee: STOROpack, Inc., Cincinnati, OH (US)

(*) Notice: Under 35 U.S.C. 154(b), the term of this patent shall be extended for 0 days.

(21) Appl. No.: 09/186,536

(22) Filed: Nov. 5, 1998

(51) Int. Cl.[7] .............................. B65B 9/20; B65B 57/04
(52) U.S. Cl. ............................... 53/64; 53/551; 53/552; 53/375.9
(58) Field of Search ............................. 53/64, 551, 552, 53/375.9; 493/302

(56) References Cited

U.S. PATENT DOCUMENTS

| | | | |
|---|---|---|---|
| 2,899,875 | * | 8/1959 | Leasure .................................. 53/551 |
| 3,133,390 | * | 5/1964 | Leasure et al. ...................... 53/551 |
| 3,173,233 | * | 3/1965 | Klein ..................................... 53/552 |
| 3,796,021 | * | 3/1974 | Toss ...................................... 53/552 |
| 3,827,552 | * | 8/1974 | Janhonen . |
| 3,855,053 | * | 12/1974 | Fuss . |
| 3,868,056 | * | 2/1975 | Keren . |
| 3,893,598 | * | 7/1975 | Fuss . |
| 3,926,364 | * | 12/1975 | Janhohen . |
| 3,948,436 | * | 4/1976 | Bambara . |
| 4,011,798 | * | 3/1977 | Bambara et al. . |
| 4,018,034 | * | 4/1977 | Keren . |
| 4,029,539 | * | 6/1977 | Doll . |
| 4,074,505 | * | 2/1978 | Keren et al. . |
| 4,087,002 | * | 5/1978 | Bambara et al. . |
| 4,159,079 | * | 6/1979 | Phillips, Jr. . |
| 4,417,936 | * | 11/1983 | Gaffney . |
| 4,564,407 | * | 1/1986 | Tsuruta . |
| 4,584,822 | * | 4/1986 | Fielding et al. . |
| 4,714,506 | * | 12/1987 | Yamashiro et al. . |
| 4,845,922 | * | 7/1989 | Sweere .................................. 53/551 |
| 4,852,743 | * | 8/1989 | Ridgeway . |
| 4,868,025 | * | 9/1989 | Strzelewicz . |
| 4,894,265 | * | 1/1990 | Chang et al. . |
| 4,923,065 | * | 5/1990 | Ridgeway . |
| 5,071,009 | * | 12/1991 | Ridgeway . |
| 5,196,254 | * | 3/1993 | Akiyama . |

(List continued on next page.)

FOREIGN PATENT DOCUMENTS

| 0787574A2 | * | 8/1997 | (EP) . |
|---|---|---|---|
| 08216258 | * | 8/1996 | (JP) . |
| WO 97/00123 | | 1/1997 | (WO) . |

OTHER PUBLICATIONS

U.S. patent application Serial No. 09/117,081, an English translation of PCT/FR/00123, filed Jul. 22, 1998.

* cited by examiner

Primary Examiner—John Sipos
(74) Attorney, Agent, or Firm—Wood, Herron & Evans, L.L.P.

(57) ABSTRACT

A machine for producing cushioning product is provided which allows a user to select a length of product to be produced from a plurality of selectable lengths. The machine comprises a frame, a plastic sheet supply assembly mounted on the frame, a forming assembly mounted on the frame downstream of the plastic sheet supply assembly which forms the plastic sheet into a tube with the lateral edges of the plastic sheet overlapping, a pulling assembly mounted on the frame downstream of the forming assembly which pulls the plastic sheet from the plastic sheet supply assembly to and over the forming assembly, a first heat sealing assembly mounted on the frame downstream of the forming assembly which is selectively activatable to longitudinally heat seal the overlapping lateral edges of the tube together a selected length from a continuous plurality of selectable lengths, and a second heat sealing assembly mounted on the frame downstream of the first heat sealing assembly which transversely heat seals the tube at each end of the longitudinal seal formed by the first heat sealing assembly to thereby form an air pillow.

12 Claims, 6 Drawing Sheets

U.S. PATENT DOCUMENTS

| | | | |
|---|---|---|---|
| 5,203,761 | * | 4/1993 | Reichental et al. . |
| 5,254,074 | * | 10/1993 | Landers et al. . |
| 5,269,122 | * | 12/1993 | Reichental et al. . |
| 5,287,968 | * | 2/1994 | Ridgeway . |
| 5,339,602 | * | 8/1994 | Landers et al. . |
| 5,348,157 | * | 9/1994 | Pozzo . |
| 5,388,701 | * | 2/1995 | Ridgeway . |
| 5,556,019 | * | 9/1996 | Morris . |
| 5,571,067 | | 11/1996 | Ratzel . |
| 5,573,168 | * | 11/1996 | Kannankeril et al. . |
| 5,588,533 | * | 12/1996 | Farison et al. . |
| 5,620,096 | * | 4/1997 | Pozzo . |
| 5,635,917 | * | 6/1997 | Todman . |
| 5,649,409 | * | 7/1997 | Gujer et al. . |
| 5,678,695 | * | 10/1997 | Ridgeway et al. . |
| 5,778,642 | * | 7/1998 | Fuss et al. . |
| 5,782,061 | * | 7/1998 | Clazie et al. . |
| 5,782,067 | * | 7/1998 | Fuss et al. . |
| 5,788,078 | * | 8/1998 | Fuss . |
| 5,803,263 | * | 9/1998 | Pozzo . |
| 5,813,585 | * | 9/1998 | Kannankeril et al. . |
| 5,816,018 | * | 10/1998 | Bois . |
| 5,826,404 | * | 10/1998 | Fuss et al. . |

CUSHIONING PRODUCT AND MACHINE AND METHOD FOR PRODUCING SAME

FIELD OF THE INVENTION

This invention relates generally to cushioning products for protecting during shipping an item packaged in a box or carton and machines for making same, and more particularly to an air pillow cushioning product and a machine for making such an air pillow.

BACKGROUND OF THE INVENTION

In the process of shipping an item from one location to another, a protective packaging material is typically placed in the shipping carton or box, to fill any voids and/or to cushion the item during the shipping process. Some conventional protective packaging materials are plastic, for example expanded polystyrene, foam peanuts and starch peanuts. While these conventional materials seem to perform adequately as cushioning products, they are not without disadvantages.

The most serious drawback of these types of cushioning products is the mess that is tended to be made when unpacking a carton or box shipped with such loosefill as the cushioning material. The peanuts tend to be strewn about the unpacking area, requiring time intensive cleanup. Further aggravating matters, in the case of plastic peanuts, is the tendency of the plastic peanuts to cling to the item shipped in the box, to people, to clothing, to carpet and to other structures in the unpacking area, due to static electricity.

One proposed solution for overcoming the deficiencies of loosefill as described above is the Flo-Pak Pouch™ marketed by Free Flow Packaging International, Inc. of Redwood City, Calif. The Flo-Pak Pouch™ utilizes a cylindrical plastic sleeve which is filled with polystyrene loosefill and the ends of which are gathered and tied off to form a cylindrical shaped or "sausage" shaped bag of loosefill. While the Flo-Pak Pouch™ does prevent the mess described above caused by loosefill, it is not without its own drawbacks. For example, the Flo-Pak Pouch™ is somewhat difficult to utilize when packing articles to be shipped, as the cylindrical shaped bags do not bend easily to conform about an article within a box. Furthermore, the Free Flow Packaging machine which makes the Flo-Pak Pouch™ does not include any capability for producing a string of bags of loosefill interconnected end-to-end, i.e. the Free Flow Packaging machine has the capability for producing only individual filled bags.

It would be desirable to better harness such loosefill material for cushioning purposes to exploit the cushioning properties of such loosefill but at the same time to eliminate the drawback of the mess associated therewith, while at the same time solving the problems presented by the Flo-Pak Pouch™.

To this end, the invention disclosed in application Ser. No. 09/065,221 filed Apr.23, 1998, assigned to the assignee of the present invention and hereby incorporated by reference herein as if fully set forth in its entirety, provides a number of cushioning products utilizing loosefill yet which avoid the prior problem of mess associated therewith, and which also provide for convenient loading of the product to be shipped into a carton therewith. One such cushioning product comprises a bag filled with loosefill packing material. The bag has a length, a width and a thickness, with the length and the width being substantially greater than the thickness. The loosefill packing material may be plastic peanuts, for example expanded polystyrene peanuts, or starch peanuts. A filled bag of loosefill according to this invention is preferably generally rectangular when viewed in side elevation and in end elevation, to promote wrapping an item to be shipped. The bag, which preferably is made of plastic, or even transparent plastic, preferably allows air to escape from it. To that end, the bag preferably includes a number of small holes therein. By allowing air to escape a "balloon" effect of the bags is avoided and the cushioning effect derives only from the cushioning qualities of the loosefill, rather than the compressability of the air within the bag and/or the elasticity of the bag. The cushioning product of that invention may also comprise a plurality of bags filled with loosefill packing material, with the bags being connected end-to-end in a string. In that case, a web of preformed and interconnected bags is provided, and loosefill packing material is inserted into the bags which are then sealed.

The invention of application Ser. No. 09/065,221 thus provides the cushioning qualities of loosefill, for example plastic or starch peanuts, yet without the attendant difficulties associated therewith. In addition, the preferred geometry of the bags of loosefill provide for easy insertion into a shipping box or carton as well as wrapping around the item to be shipped.

One limitation of the invention of application Ser. No. 09/065,221, however, is that the length of the cushioning product is not readily varied since the length of the cushioning product is dependent upon the length of the preformed interconnected bags which are purchased in web form and loaded onto the machine in a roll. It would be desirable to be able to vary the length of cushioning product produced without having to remove the existing roll of bags of one length and replacing that roll of bags with another roll of bags of the desired length.

Another feature of the invention of application Ser. No. 09/065,221 is the provision of loosefill for filling the bags to provide cushioning capability. In some applications it might be desirable to do away with the loosefill if an acceptable cushioning product can still be produced.

One attempt at eliminating the web of preformed and interconnected bags in forming a product containing bag has been made by Dibipack of Italy. The Dibipack machine uses a sheet of plastic film which is unrolled off of a roll, is formed into a cylindrical container, is filled with product and is then sealed. That machine comprises a frame, a plastic sheet supply assembly mounted on the frame, a forming assembly mounted on the frame downstream of the plastic sheet supply assembly which forms the plastic sheet into a tube with the lateral edges of the plastic sheet overlapping, a pulling assembly mounted on the frame downstream of the forming assembly which pulls the plastic sheet from the plastic sheet supply assembly to and over the forming assembly, a first heat sealing assembly mounted on the frame downstream of the forming assembly which heat seals the overlapping lateral edges of the tube together, and a second heat sealing assembly mounted on the frame downstream of the first heat sealing assembly which transversely heat seals the tube at each end of the longitudinal heat seal formed by the first heat sealing assembly. This machine is limited, however, in that the first heat sealing assembly is comprised of a fixed length heat sealing bar which is movable into and out of contact with the overlapping lateral edges of the tube to longitudinally heat seal the overlapping lateral edges. Thus, a user is limited to the length of bag capable of being produced on this machine to multiples of the length of this longitudinal heat sealing bar. Stated differently, this machine provides no capability of forming a desired length of bag other than in a length equal to the length of the longitudinal heat sealing bar or multiples thereof.

SUMMARY OF THE INVENTION

The present invention is a machine for producing cushioning product which allows a user to select a length of product to be produced from a continuous plurality of selectable lengths. A user is not limited to the length of preformed interconnected bags, nor to the length of the longitudinal heat sealing bar and multiples thereof, as determining the length of cushioning product to be formed.

In one aspect of the present invention, a machine for producing cushioning product comprises a frame, a plastic sheet supply assembly mounted on the frame, a forming assembly mounted on the frame downstream of the plastic sheet supply assembly which forms the plastic sheet into a tube with the lateral edges of the plastic sheet overlapping, a pulling assembly mounted on the frame downstream of the forming assembly which pulls the plastic sheet from the plastic sheet supply assembly to and over the forming assembly, a first heat sealing assembly mounted on the frame downstream of the forming assembly which is selectively activatable to longitudinally heat seal the overlapping lateral edges of the tube together a selected length from a continuous plurality of selectable lengths, and a second heat sealing assembly mounted on the frame downstream of the first heat sealing assembly which transversely heat seals the tube at each end of the longitudinal seal formed by the first heat sealing assembly to thereby form an air pillow.

The forming assembly preferably comprises in combination a cylinder and a collar, the collar transitioning the plastic sheet from a generally planar configuration as the sheet is pulled off of the plastic sheet supply assembly to a generally cylindrical configuration about the cylinder.

The pulling assembly preferably comprises a pair of drive belts, one belt of the pair of belts being located on each lateral side of the tube, and each of the pair of drive belts drivingly engaging the tube.

The first heat sealing assembly preferably comprises a heated wheel which is selectively movable into and out of contact with the overlapping lateral edges of the tube to heat seal the tube overlapping lateral edges together.

The second heat sealing assembly preferably comprises a pair of heated movable bars, positioned transversely of the longitudinal axis of the tube, and which are movable from an inoperative position spaced apart fore and aft of the tube to an operative sealing position wherein the bars are moved together such that the fore and aft wall portions of the tube are heat sealed together.

The present invention also provides a method of making a cushioning product, as well as a cushioning product made by the method. The method comprises providing a plastic sheet with lateral edges, forming the plastic sheet into a tube with the lateral edges of the plastic sheet overlapping, selecting a length from a continuous plurality of selectable lengths along which to longitudinally heat seal the overlapping lateral edges of the tube together, longitudinally heat sealing the overlapping lateral edges of the tube together the selected length, and transversely heat sealing the tube at each end of the longitudinal heat seal to thereby form an air pillow.

The major advantage of the present invention is that a user may readily vary the length of cushioning product produced. The user is not limited to any predetermined bag length as when a web of such preformed bags is utilized, nor is a user limited to a discrete length by the length of a longitudinal heat sealing bar and multiples thereof. Rather, a supply of plastic sheet is fed into the machine of the present invention which has the capability of producing air pillows of continuously variable lengths. In addition, as the machine of the present invention produces sealed air pillows, loosefill is not required as the cushioning qualities of the air itself can be exploited. However, if desired, the peanut dispensing portion of the machine of application Ser. No. 09/065,221 can be incorporated into the machine of the present invention to produce a bag or a string of interconnected bags of loosefill packing material.

These and other advantages of the present invention will become more readily apparent during the following detailed description taken in conjunction with the drawings herein, in which:

DETAILED DESCRIPTION OF THE INVENTION

Figure 1:
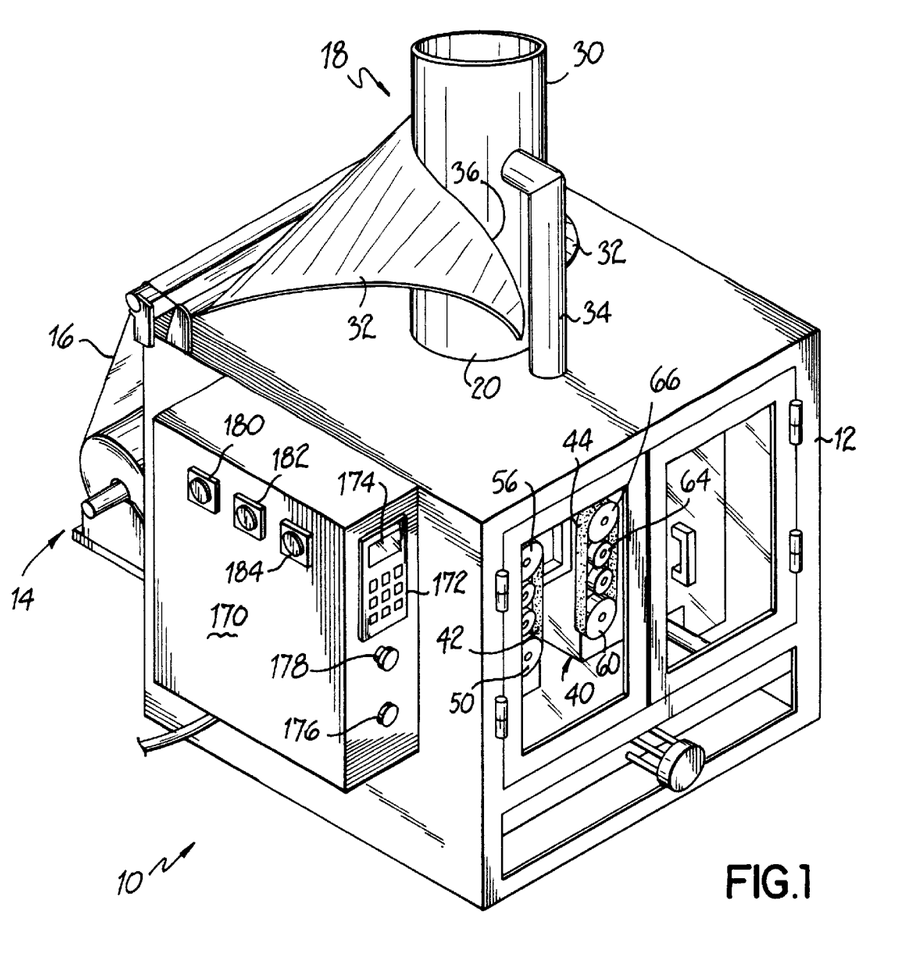
FIG. 1 is a perspective view of the machine of the present invention.
Figure 2:
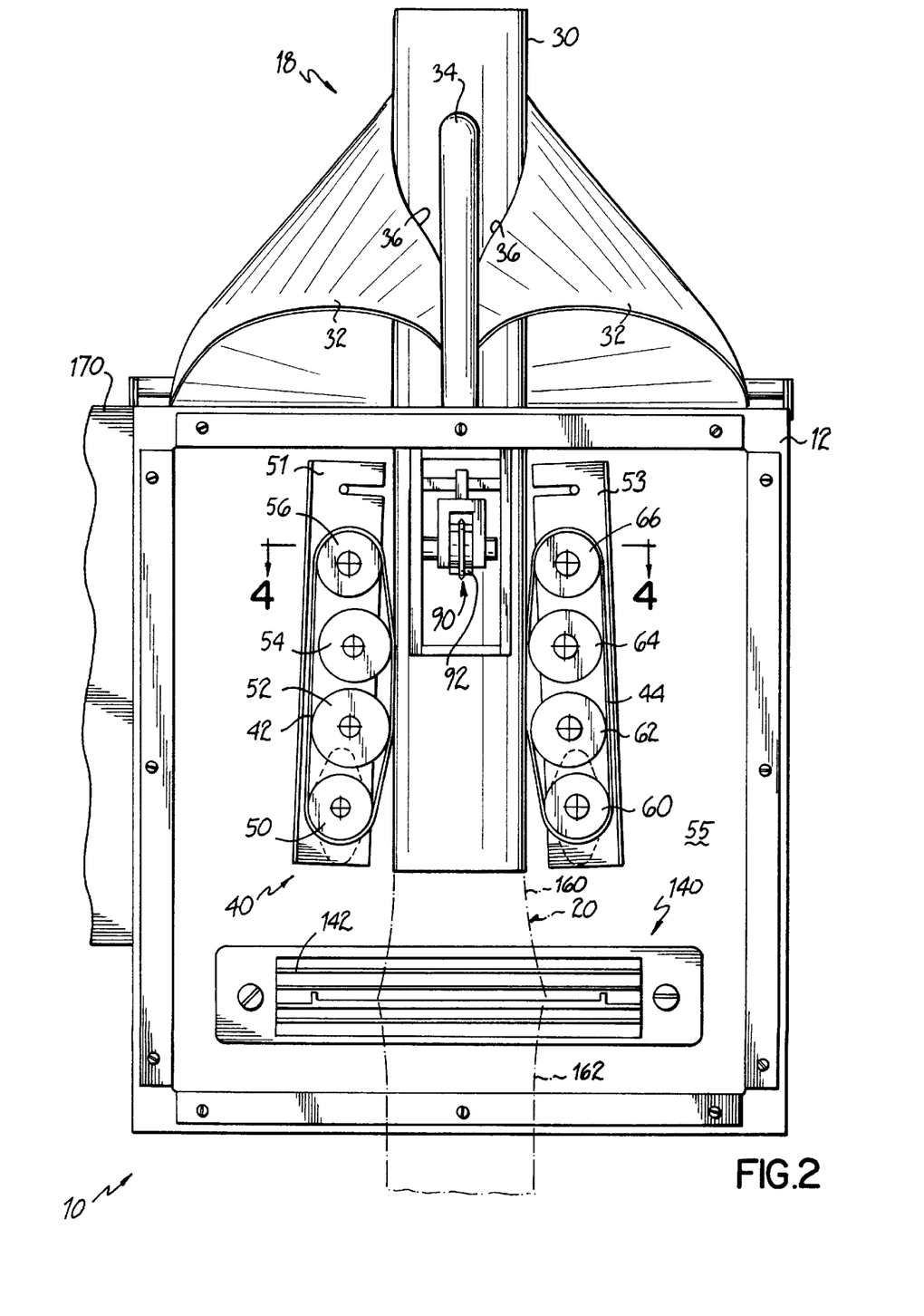
FIG. 2 is a front elevation view of the machine of FIG. 1.
Figure 3:
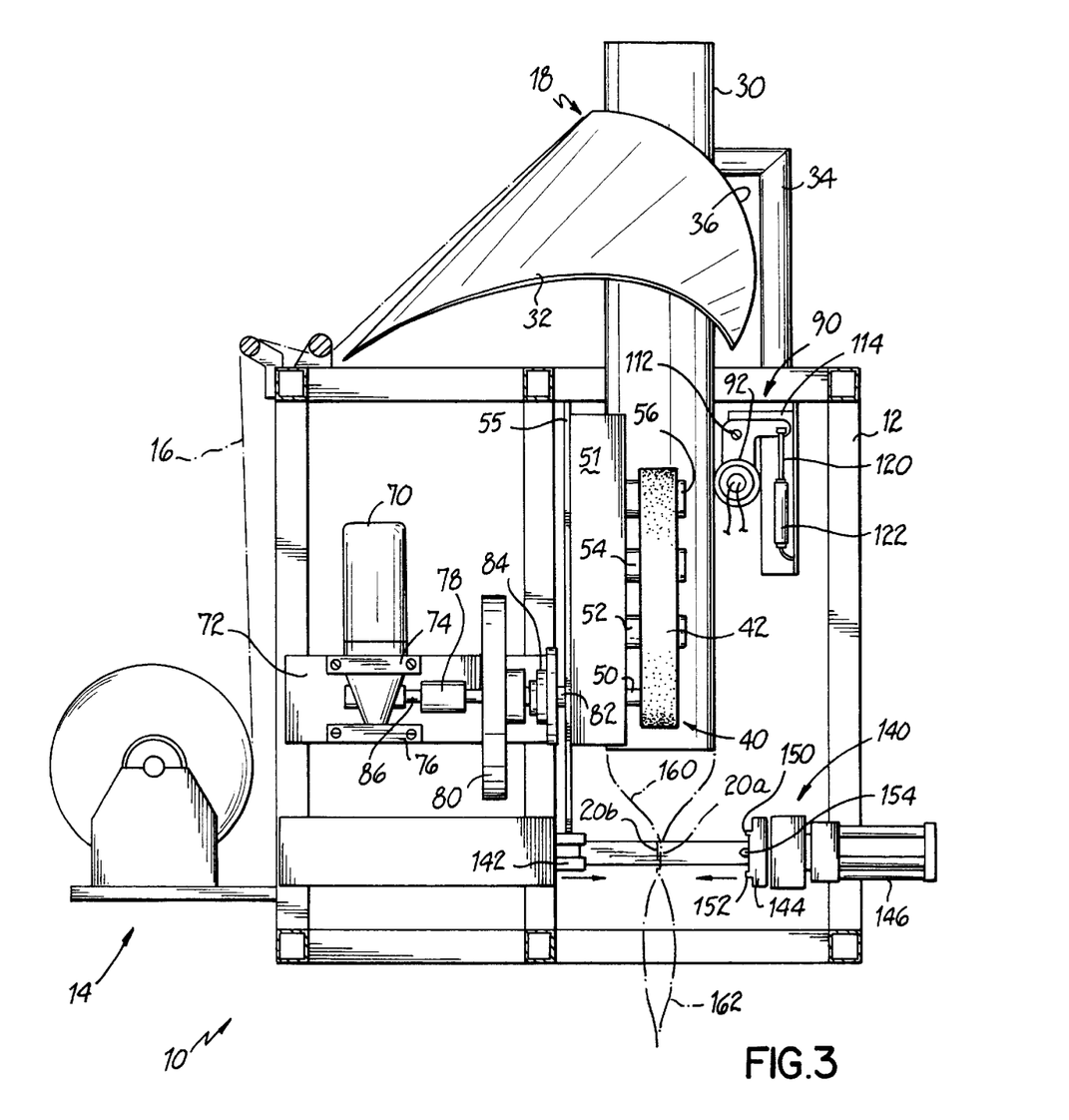
FIG. 3 is a side elevation view of the machine of FIGS. 1 and 2.

Referring first to FIGS. 1–3, there is illustrated a machine 10 for producing cushioning product according to the present invention. The machine 10 includes a machine frame 12. A plastic sheet supply assembly 14 is mounted on the frame 12 and supplies a sheet of plastic film 16 to a forming assembly 18. Alternatively, the plastic sheet supply assembly 14 could be mounted on a separate cart which is dockable to or otherwise usable with the frame 12. Thus, the term "frame" is intended to embrace all such variations. The forming assembly 18 is mounted on the frame 12 downstream of the plastic sheet supply assembly 14. It forms the plastic sheet 16 into a tube 20, for example a cylindrical tube 20, with the lateral edges 22 and 24 of the tube 20 overlapping as at 26 (FIG. 4).

More particularly, the forming assembly 18 comprises in combination a forming tube, e.g. forming cylinder 30, and a forming collar 32, though the invention is not limited to any such combination or illustrated geometries of tube and collar. The cylinder 30 is mounted to the upper end of the machine frame 12 via a support 34, and it extends downwardly into the machine 10 as is shown in FIG. 2. The collar 32, also known as a film forming "shoe", is likewise mounted to the upper end of the frame 12. Clearance is provided between the cylinder 30 and the radially inner edges 36 of the collar 32 to allow the plastic sheet 16 to pass over the collar 32 downwardly and around the cylinder 30. The cylinder 30 and collar 32 thus form the plastic sheet 16, which is in a generally planar configuration as it is pulled off of the plastic sheet supply assembly 14, into a generally cylindrical, tubular configuration about the cylinder 30.

Figure 4:
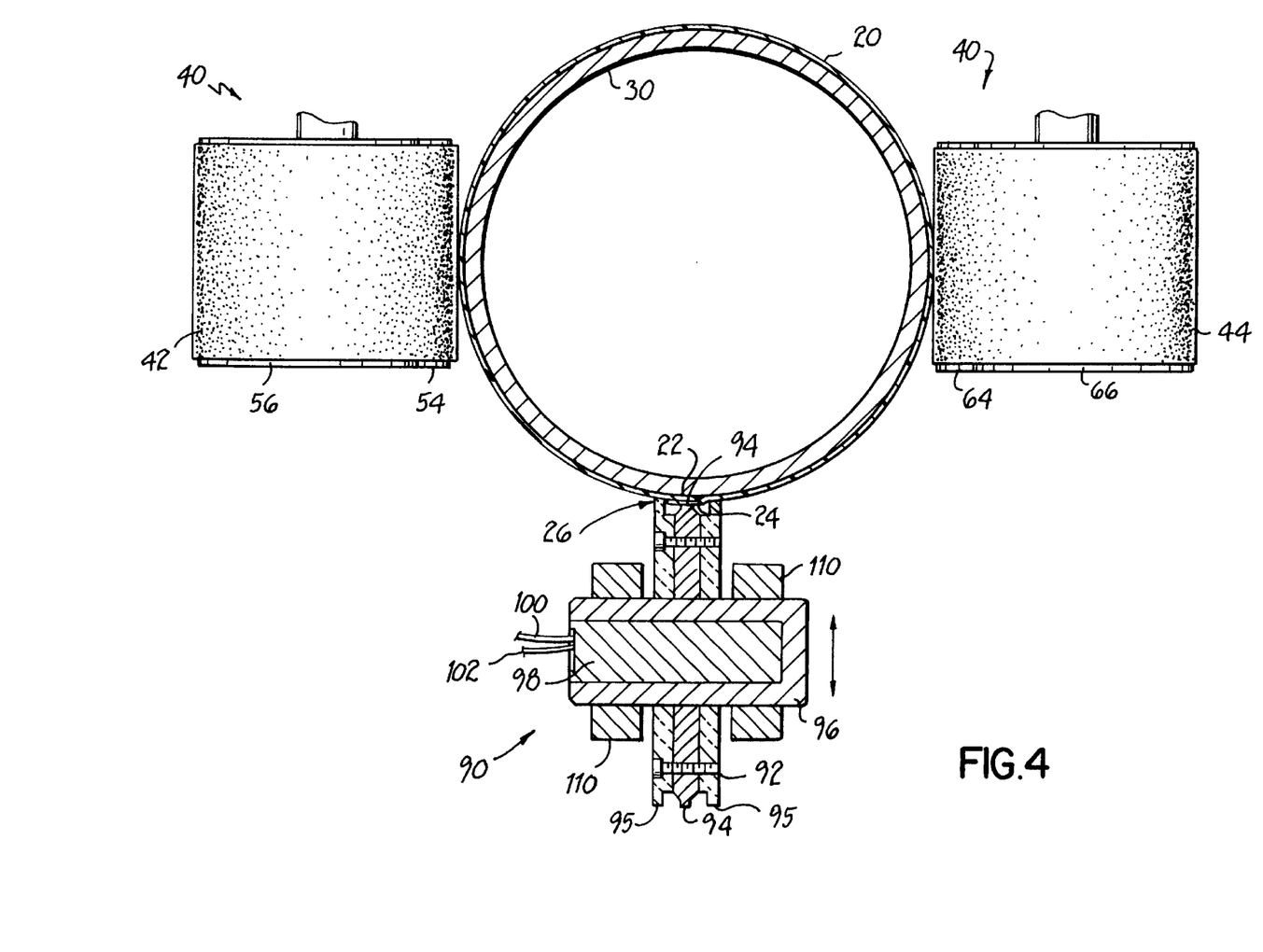
FIG. 4 is a view taken along line 4—4 of FIG. 2.

As best seen in FIGS. 2–4, a pulling assembly 40 is mounted on the frame 12 downstream of the forming assembly 18. The pulling assembly 40 pulls the plastic sheet 16 from the plastic sheet supply assembly 14 to and over the forming assembly 18. More particularly, the pulling assembly 40 comprises a pair of drive belts 42 and 44, one belt of the pair 42, 44 of belts being located on each lateral side of the cylinder 30 and hence on each lateral side of the cylindrically configured plastic tube 20. Belt 42 passes over a driven roller 50 and idler rollers 52, 54 and 56. Likewise, belt 44 passes over a driven roller 60 and idler rollers 62, 64 and 66. The rollers 50, 52, 54, 56 and 60, 62, 64 and 66 are rotatably mounted to a pair of brackets 51 and 53 respectively which themselves are mounted to a vertical plate 55 forming a part of machine frame 12. All the rollers 50, 52, 54, 56, 60, 62, 64 and 66 are preferably fabricated of Delrin.

Referring to FIG. 3, it will be seen that the driven roller 50 is driven by a motor 70 mounted to a motor mounting plate 72 by upper and lower motor mounting brackets 74 and 76 respectively. The motor 70 is connected to the driven pulley 50 through a coupling 78, gear 80 and bearing 82. Gear 80 drives a similar gear (not shown for clarity) mounted to a shaft (also not shown for clarity) on which driven roller 60 is also mounted. Thus, motor 70 drives both driven rollers 50 and 60.

An optical encoder 84 is mounted on the drive shaft 86 of the motor 70. The encoder 84 registers or indicates the rotation of the shaft 86 and hence the rotation of the driven rollers 50 and 60, and sends pulse signals to a microprocessor (not shown in FIG. 3) programmed to relate those signals to the linear amount of plastic sheet advanced in tubular, cylindrical form 20 by the drive belts 42, 44.

Referring now to FIGS. 2–4, there is illustrated a first heat sealing assembly 90. This assembly 90 includes a heat sealing wheel 92 preferably fabricated of brass including sealing edge 94 and outboard insulating disks or rings 95 preferably fabricated of glass-filled phenolic. The wheel 92 is rotatably mounted on a shaft 96, preferably fabricated of bronze, including a heater 98 imbedded therein and including leads 100, 102 for connection to an electricity supply. Shaft 96 is secured on each end to one end of a dog leg link 110 which is pivoted at 112 to a bracket 114 mounted to the frame 12. The other end of dog leg link 110 is connected to the piston 120 of a pneumatic piston and cylinder 122 mounted to the bracket 114.

Referring now to FIGS. 2 and 3, at the lower end of the machine 10 there is illustrated a second heat sealing assembly 140. This assembly 140 comprises a pair 142, 144 of heated movable bars. The bars 142, 144 are positioned transversely along the longitudinal axis of the cylinder 30 and hence transversely of the cylindrically formed plastic tube 20. The bars 142, 144 are movable by way of a pneumatic cylinder 146 from an inoperative position spaced apart fore and aft of the tube 20 to an operative sealing position wherein the bars 142, 144 are moved together such that the fore and aft wall portions 20a and 20b respectively of the tube 20 are heat sealed togther.

Preferably, the bars 142 and 144 include separate upper 150, lower 152 and intermediate 154 heater elements. Element 150 forms the bottom heat seal of an upper air pillow 160. The lower element 152 forms the upper heat seal of a lower air pillow 162. The intermediate element 154 melts completely through the plastic sheet to separate the upper and lower air pillows 160, 162. In the event that a string of interconnected air pillows is desired to be produced, rather than individual air pillows, the machine 10 would preferably include a means for selectively activating and deactivating the intermediate element 154 as desired. Alternatively, the element 154 could be replaced with a selectively activatable blade to sever adjacent air pillows.

Referring back to FIG. 1, a control box 170 houses the associated electrical (e.g. microprocessor) and pneumatic controls for the machine 10. A keypad 172 with display 174 allows a user to input the desired length of air pillow to be formed, as well as the desired number of pillows to be formed. A cycle start button 176 activates the machine 10, whereas an emergency stop button 178 stops the machine 10 in the event of an emergency. Temperature dials 180 and 182 control the temperature of the heat sealing wheel 92 and heat sealing bars 142, 144 respectively. Control 184 is provided for turning power to the machine 10 on and off.

Figure 5:
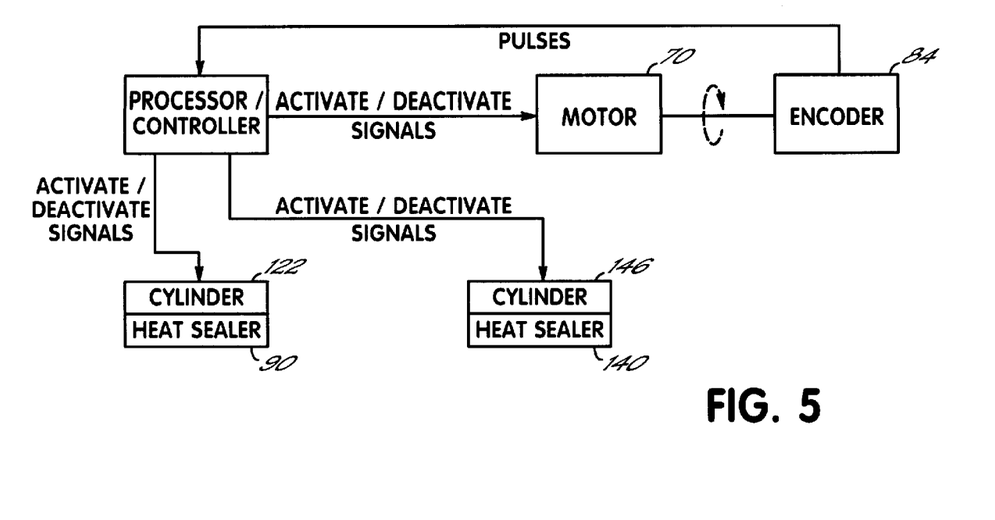
FIG. 5 is a block diagram of the operation of the machine of FIGS. 1–4.

In use, a user inputs the length of air pillow desired (e.g., 10 inches, 12 inches, etc.), along with the number of air pillows desired, via the keypad 172 and verifies same with the display 174. The temperatures are adjusted with the dials 180 and 182 (heat sealing wheel 92 preferably being set at 380° F. and heat sealing bars 142, 144 preferably being set at 390–400° F.) and then the start button 176 is depressed. Simultaneously, air cylinder 122 retracts moving heating wheel 92 into contact with the overlapped portion 26 of the cylindrically formed plastic tube 20, and the motor 70 is started thus driving belts 42 and 44 pulling the plastic sheet 16 off of the plastic sheet supply 14 and over the collar 32 and around the cylinder 30. Heating wheel 92 is rotated solely by the advancing cylindrically formed plastic tube 20. When the heat wheel 92 has formed a longitudinal heat seal along the overlapped portion 26 corresponding to the desired length of the air pillow entered via the keypad 172 (as monitored by encoder 84 and the microprocessor), simultaneously the pneumatic cylinder 122 extends thus pivoting the wheel 92 away from and out of contact with the overlapped portion 26, and the motor 70 is stopped. While the now longitudinally sealed cylindrical plastic tube 20 is stationary, the second heat sealing assembly 140 is activated once to form the lower seal of the air pillow being formed. Then, again, simultaneously, air cylinder 122 retracts moving heating wheel 92 back into contact with overlapped portion 26, and motor 70 is started causing the belts 42 and 44 to advance the plastic tube 20 downwardly. Once a second like length of longitudinal heat seal has been formed, the motor 70 is again stopped, cylinder 122 again extends pivoting heat wheel 92 away from overlapped portion 26 and the second heat sealing assembly 140 is activated a second time to form the upper seal of the air pillow being formed. The cycle is repeated until the desired number of air pillows of the desired length have been produced, at which time operation of the motor 70 ceases, cylinder 122 is moved to and remains in the extended position, and bars 142,144 are moved to and remain in their spaced apart positions, the machine 10 awaiting input of the next command via the keypad 172. A block diagram of the operation of the machine 10 is illustrated in FIG. 5.

The plastic sheet 16 is preferably 0.0015 inches thick and is preferably of the type available from AEP Industries, Inc. of Hackensack, N.J. as part number 11CFPPF or 26FLPPF. Collar or shoe 30 is preferably of the type available from Former Tech, Inc. of Austin, Tex. as part number FBS-500. Belts 42 and 44 are perfectly of the type available from Burrell-Leder, Inc. of Skokie, Ill. as part number 802-06-013/B-13905. Motor 70 is preferably a Dayton 1/15 hp, 115V, 100 rpm, 27 in-lb gear motor available from Grainger of Addison, N.J. as part number ZZ803D. Coupling 78 is preferably a 3-jaw coupling available from Boston Gear of Boston, Mass. as part number BF10. Gear 80 is preferably a cast iron stock spur gear, 14½° pressure angle, 9" pitch diameter available from Martin Sprocket and Gear of Arlington, Tex. as part number C1090. Bearing 82 is preferably of the type available from Nice Bearing Co. and distributed by Motion Industries of Chicago, Ill. as part number R12ZZ. Encoder 84 is preferably of the type available from Monroe Machine and Design, Inc. of Jamesburg, N.J. as part number 802-05-011. Heater 98 is preferably a ½ inch O.D., 2½ inches long, 300 Watt, 120V unit available from Watlow Corp. of Columbia, Md. Cylinder 120 is preferably of the type available from Bimba, Inc. of Monee, Ill. as part number 022-RP. Heat sealing assembly 140 is preferably of the type available from Monroe Machine And Design, Inc. of Jamesburg, N.J. as part number 802-06-012. The speed of the cylindrically formed plastic sheet film is variable with motor 70 up to a speed of 471 inches per minute; the preferred speed is 400–430 inches per minute.

Figure 6:
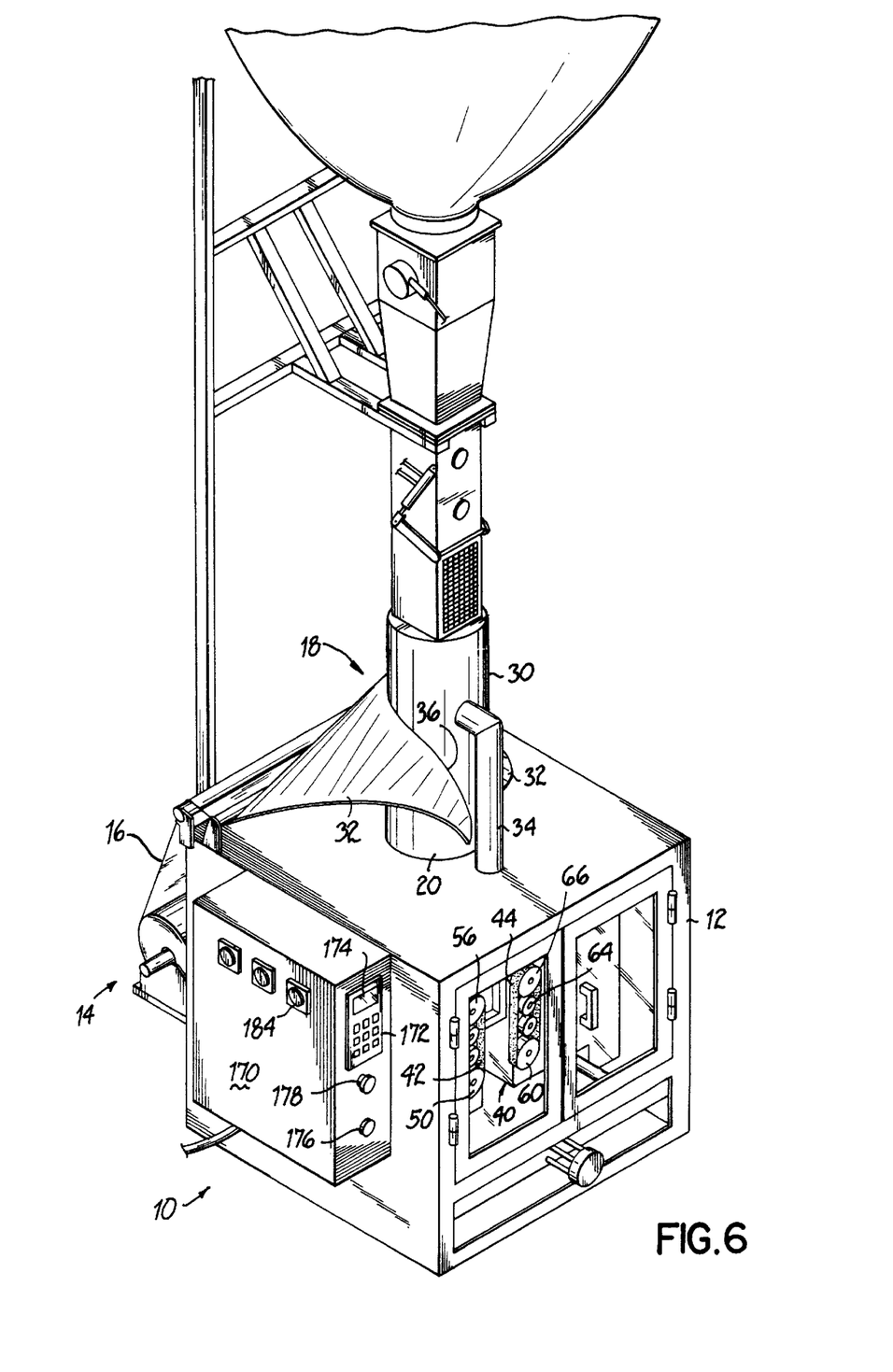
FIG. 6 is a perspective view of the machine of FIGS. 1–5 in combination with the peanut dispensing portion of the machine of application Ser. No. 09/065,221.

Those skilled in the art will readily recognize numerous adaptations and modifications which can be made to the present invention which will result in an improved cushioning product and machine, yet all of which will fall within the spirit and scope of the present invention as defined in the following claims. For example, and as discussed above, the machine of the present invention could be combined with the peanut dispensing portion of the machine of application Ser. No. 09/065,221 to produce a bag or a string of interconnected bags of loosefill packing material. See FIG. 6. In that case the film or sheet would need to be porous or otherwise include holes, slits or perforations therein to allow air to escape from the bag to avoid a "balloon" effect. Further, film or sheet other than plastic film may be used with the machine of the invention. For example, biodegradable starch-based film may be used; the only requirement is that the film be heat fusable or heat weldable. In such a case starch peanuts could be used to fill the bags made from starch-based film to produce a biodegradable cushioning product. Still further, the bags formed by the present invention could be used to contain product other than cushioning product, for example food items, hardware items, medical supplies or any other type of consumer product which is typically packaged in such a bag. Accordingly, the invention is to be limited only by the scope of the following claims and their equivalents.

What is claimed is:

1. A machine for producing cushioning product comprising:
    a frame;
    a plastic sheet supply assembly mounted on said frame;
    a forming assembly mounted on said frame downstream of said plastic sheet supply assembly which forms the plastic sheet into a tube with the lateral edges of the plastic sheet overlapping;
    a pulling assembly mounted on said frame downstream of said forming assembly which pulls the plastic sheet from said plastic sheet supply assembly to and over said forming assembly;
    a first heat sealing assembly mounted on said frame downstream of said forming assembly which is selectively activatable to longitudinally heat seal the overlapping lateral edges of the tube together a selected length from a continuous plurality of selectable lengths;
    a second heat sealing assembly mounted on said frame downstream of said first heat sealing assembly which transversely heat seals the tube at each end of the longitudinal seal formed by said first heat sealing assembly to thereby form an air pillow;
    a sensor operatively associated with said pulling assembly which senses a length of the tube formed and generates signals representative thereof; and
    a processor/controller which processes the signals from said sensor and controls said first heat sealing assembly in response thereto to produce the selected length of the tube.

2. The machine of claim 1 wherein said forming assembly comprises in combination a cylinder and a collar, said collar transitioning the plastic sheet from a generally planar configuration as the sheet is pulled off of said plastic sheet supply assembly to a generally cylindrical configuration about said cylinder.

3. The machine of claim 1 wherein said pulling assembly comprises a pair of drive belts, one belt of said pair of belts being located on each lateral side of said tube, and each of said pair of drive belts drivingly engaging the tube.

4. The machine of claim 1 wherein said first heat sealing assembly comprises a heated wheel which is selectively movable into and out of contact with the overlapping lateral edges of the tube to heat seal the tube overlapping lateral edges together.

5. The machine of claim 1 wherein said second heat sealing assembly comprises a pair of heated movable bars, positioned transversely of the longitudinal axis of the tube, and which are movable from an inoperative position spaced apart fore and aft of the tube to an operative sealing position wherein said bars are moved together such that the fore and aft wall portions of the tube are heat sealed together.

6. A machine for producing cushioning product comprising:
    a frame;
    a plastic sheet supply assembly mounted on said frame;
    a forming assembly mounted on said frame downstream of said plastic sheet supply assembly which forms the plastic sheet into a tube with the lateral edges of the plastic sheet overlapping, said forming assembly comprising in combination a cylinder and a collar, said collar transitioning the plastic sheet from a generally planar configuration as the sheet is pulled off of said plastic sheet supply assembly to a generally cylindrical configuration about said cylinder;
    a pulling assembly mounted on said frame downstream of said forming assembly which pulls the plastic sheet from said plastic sheet supply assembly to and over said forming assembly, said pulling assembly comprising a pair of drive belts, one belt of said pair of belts being located on each lateral side of said tube, and each of said pair of drive belts drivingly engaging the tube;
    a first heat sealing assembly mounted on said frame downstream of said forming assembly which is selectively activatable to longitudinally heat seal the overlapping lateral edges of the tube together a selected length from a continuous plurality of selectable lengths, said first heat sealing assembly comprising a heated wheel movable into and out of contact with the overlapping lateral edges of the tube to heat seal the tube overlapping lateral edges together;
    a second heat sealing assembly mounted on said frame downstream of said first heat sealing assembly which transversely heat seals the tube at each end of the longitudinal seal formed by said first heat sealing assembly to thereby form an air pillow, said second heat sealing assembly comprising a pair of heated movable bars, positioned transversely of the longitudinal axis of the tube, and which are movable from an inoperative position spaced apart fore and aft of the tube to an operative sealing position wherein said bars are moved together such that the fore and aft wall portions of the tube are heat sealed together;
    sensor operatively associated with said pulling assembly which senses a length of the tube formed and generates signals representative thereof; and a processor/controller which processes the signals from said sensor and controls said first heat sealing assembly in response thereto to produce the selected length of the tube.

7. The machine of claim 1 wherein said sensor is an encoder.

8. The machine of claim 7 wherein said encoder is an optical encoder.

9. The machine of claim 6 wherein said sensor is an encoder.

10. The machine of claim 9 wherein said encoder is an optical encoder.

11. The machine of claim 1 wherein said processor/controller also controls said second heat sealing assembly in response to the signals from said sensor.

12. The machine of claim 6 wherein said processor/controller also controls said second heat sealing assembly in response to the signals from said sensor.

* * * * *

UNITED STATES PATENT AND TRADEMARK OFFICE
CERTIFICATE OF CORRECTION

PATENT NO. : 6,170,227 B1
DATED : January 7, 2001
INVENTOR(S) : Kovacs et al.

It is certified that error appears in the above-identified patent and that said Letters Patent is hereby corrected as shown below:

<u>Column 6,</u>
Line 56, "perfectly" should be -- preferably --.

Signed and Sealed this

Twenty-second Day of March, 2005

JON W. DUDAS
*Director of the United States Patent and Trademark Office*